Aug. 24, 1943.   J. BOLSEY   2,327,861
FILM SPLICING DEVICE
Filed Oct. 27, 1942
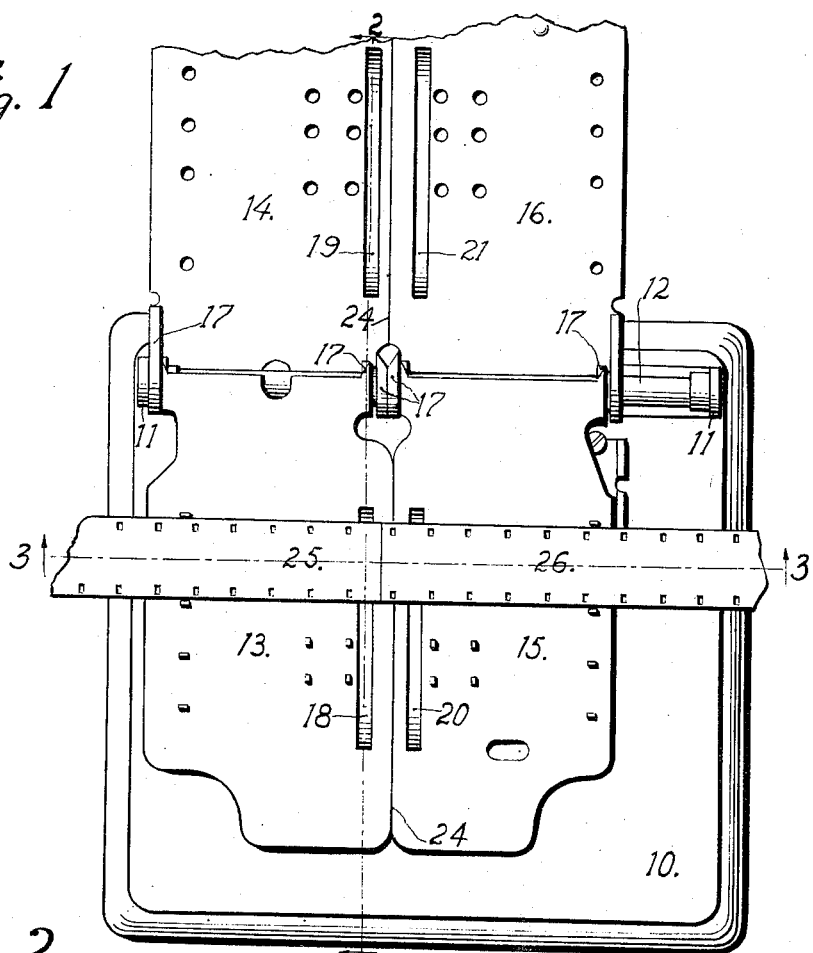
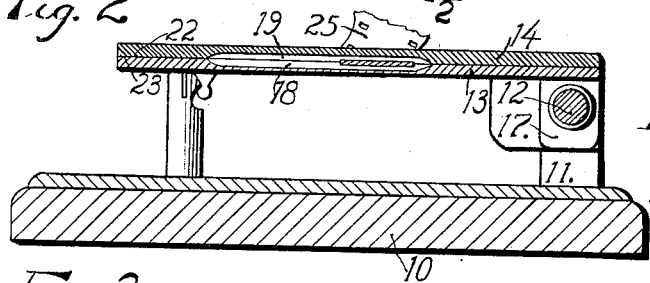
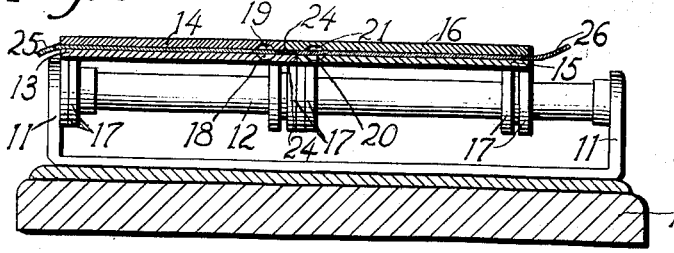
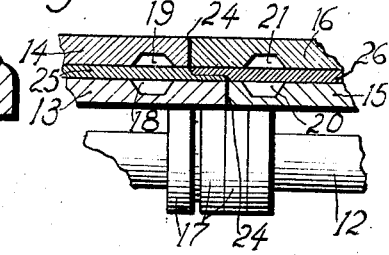
INVENTOR.
JACQUES BOLSEY Patented Aug. 24, 1943

2,327,861

UNITED STATES PATENT OFFICE 2,327,861

FILM SPLICING DEVICE

Jacques Bolsey, New York, N. Y.

Application October 27, 1942, Serial No. 463,464

2 Claims. (Cl. 154—42)

The present application is a continuation in part of my United States patent application, Ser. No. 331,493, filed April 25, 1940, for "Film splicers."

My present invention relates to film splicing devices and more particularly to film clamps used in such devices.

It is an object of my invention to prevent the cement used for splicing the film ends to each other from flowing inwardly between the jaws of the film clamps.

It is a further object of my present invention to provide a film clamping jaw for film splicing devices with means preventing sticking of the clamping face of the jaw to the surface of the spliced film.

With the above objects in view, my present invention mainly consists in providing in the clamping face of at least one of the coating film clamping jaws of film splicing devices a groove extending parallel with and close to a side edge of this jaw to prevent cement from flowing inwardly beyond this groove between the film and the jaw.

According to a preferred embodiment of my present invention, my new film splicing device comprises a base and stationary and swinging film shearing and splice-pressing film clamps mounted upon this base in contiguous side by side relation; at least one of these clamps comprises a pair of film clamping jaws having opposed grooves in the adjacent surfaces thereof close to and parallel with the inner edges of the same preventing sticking of the film ends to be spliced to the inner faces of the jaws. Preferably, both film clamps are built in this way, i. e. all four jaws are provided with grooves arranged as proposed above.

The novel features which I consider as characteristic for my invention are set forth in particular in the appended claims. The invention itself, however, both as to its construction and its method of operaiton, together with additional objects and advantages thereof, will be best understood from the following description of specific embodiments, when read in connection with the accompanying drawing in which:

Figure 1 is a plane view of a film splicing device according to the present invention in inoperative open position;

Figure 2 is a longitudinal section through the film splicing device shown in Figure 1 along line 2—2 of that figure in operative closed position with the film strips to be spliced inserted between the clamping jaws;

Figure 3 is a cross section of the film splicing device shown in Fig. 1 along line 3—3 of that figure, with superimposed closed film jaws; and Figure 4 is a detail of the device shown in Figures 1 to 3.

The film splicing device consists in the usual way of a splicer base 10, two brackets 11 mounted on said base, a shaft 12 supported by said brackets 11 at a certain distance from base 10, and film clamps attached to this shaft. Each of these film clamps consists of coacting film clamping jaws 13, 14, and 15, 16 respectively, secured turnably by the hinges 17 to shaft 12. In this way, at least the film clamping jaws 14, 15, and 16 may be turned about shaft 12 between their position shown in Figure 1 and their position shown in Figures 2 and 3.

As shown in Figures 1, 3 and 4, the clamping jaws forming the film clamps are mounted upon base 10 in contiguous side by side relation enabling thereby not only splicing but also shearing of the film strips 25 and 26 inserted between the jaws.

In accordance with the present invention, the film clamping jaws have opposed grooves 18, 19 and 20, 21 respectively in the adjacent surfaces 22, 23 of the jaws; these grooves are arranged close to and parallel with the inner jaw edges 24 preventing thereby cement from flowing inwardly between the film and the jaws.

These grooves operate as follows: for splicing, the ends of the two film strips 25 and 26 are inserted between the cooperating film jaws 13, 14 and 15, 16 respectively in the way shown in Figures 3 and 4; before closing the film clamps, cement is applied in the usual way to the overlapping end portions of the film strips. As shown in Figures 3 and 4, by closing of the film clamps the overlapping portions of the film jaws 13 and 16 are pressing the overlapping film ends of the film strips 25 and 26 against each other, thereby pressing the cement applied to these end portions inwardly between the film strips and the jaws. The cement flowing inwardly will reach the grooves provided in accordance with the present invention in the film jaws and will accumulate in the same, thereby being prevented from further flowing inwardly between the film strips and the jaws.

It will be understood that each of the elements described above, or two or more together, may also find a useful application in other types of film handling apparatus differing from the types described above.

While I have illustrated and described the invention as embodied in film splicing devices, I do not intend to be limited to the details shown, since various modifications and structural changes may be made without departing in any way from the spirit of my invention.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and therefore such adaptations should and are intended to be comprehended within the meaning and range of equivalence of the following claims.

What I claim as new and desire to secure by Letters Patent is:

1. In a film splicing device, a film clamp having a pair of coacting film clamping jaws, at least one of said jaws being provided in the clamping face thereof with a groove extending parallel with and close to a side edge of said jaw to prevent cement from flowing inwardly beyond said groove between the film and said jaw.

2. A film splicing device comprising a base, and stationary and swinging film shearing and splice pressing film clamps mounted upon said base in contiguous side by side relation, at least one of said clamps comprising a pair of film clamping jaws having opposed grooves in the adjacent surfaces thereof close to and parallel with the inner edges of the same to prevent cement from flowing inwardly between the film and said jaws.

JACQUES BOLSEY.